Patented Aug. 27, 1946

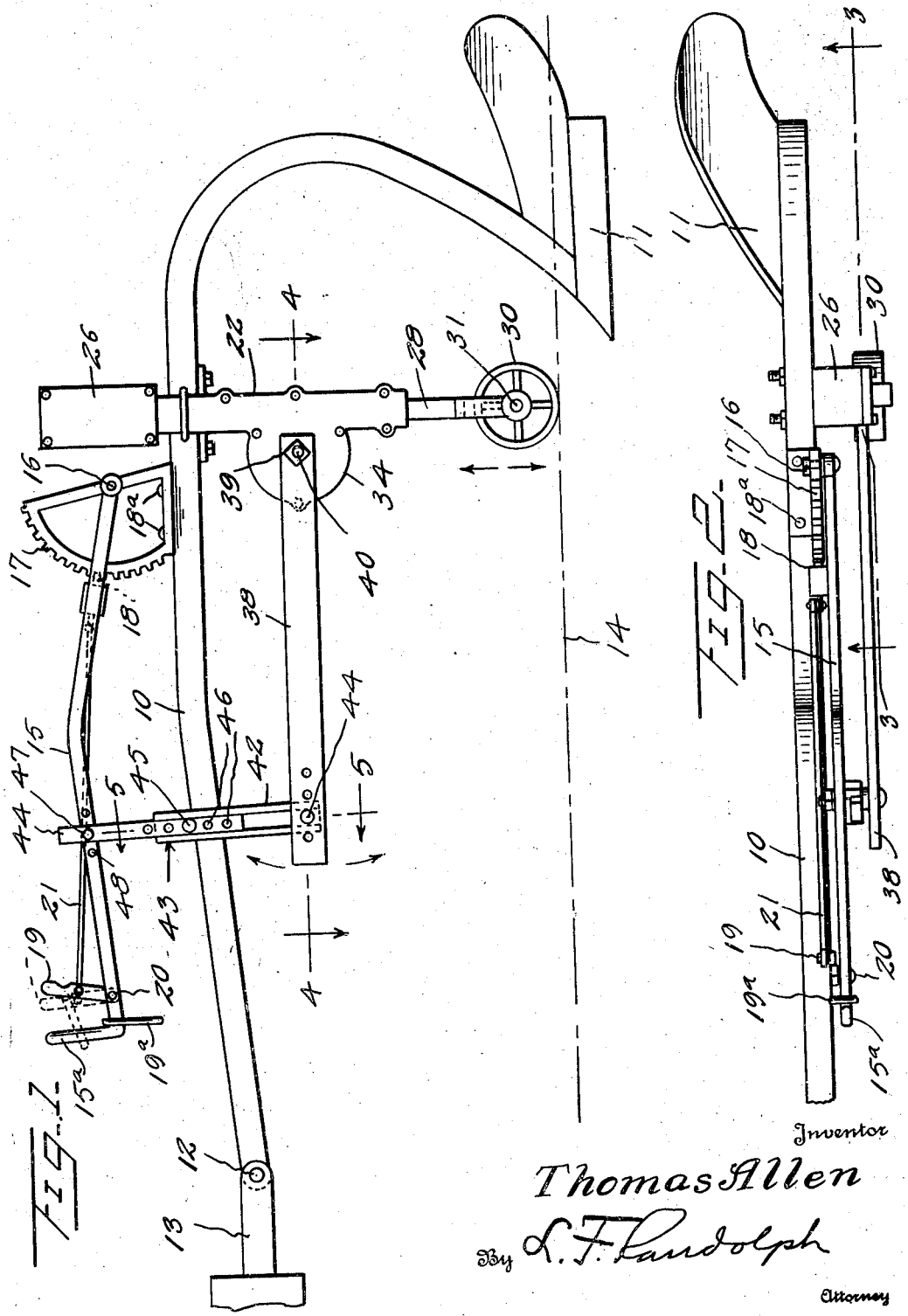

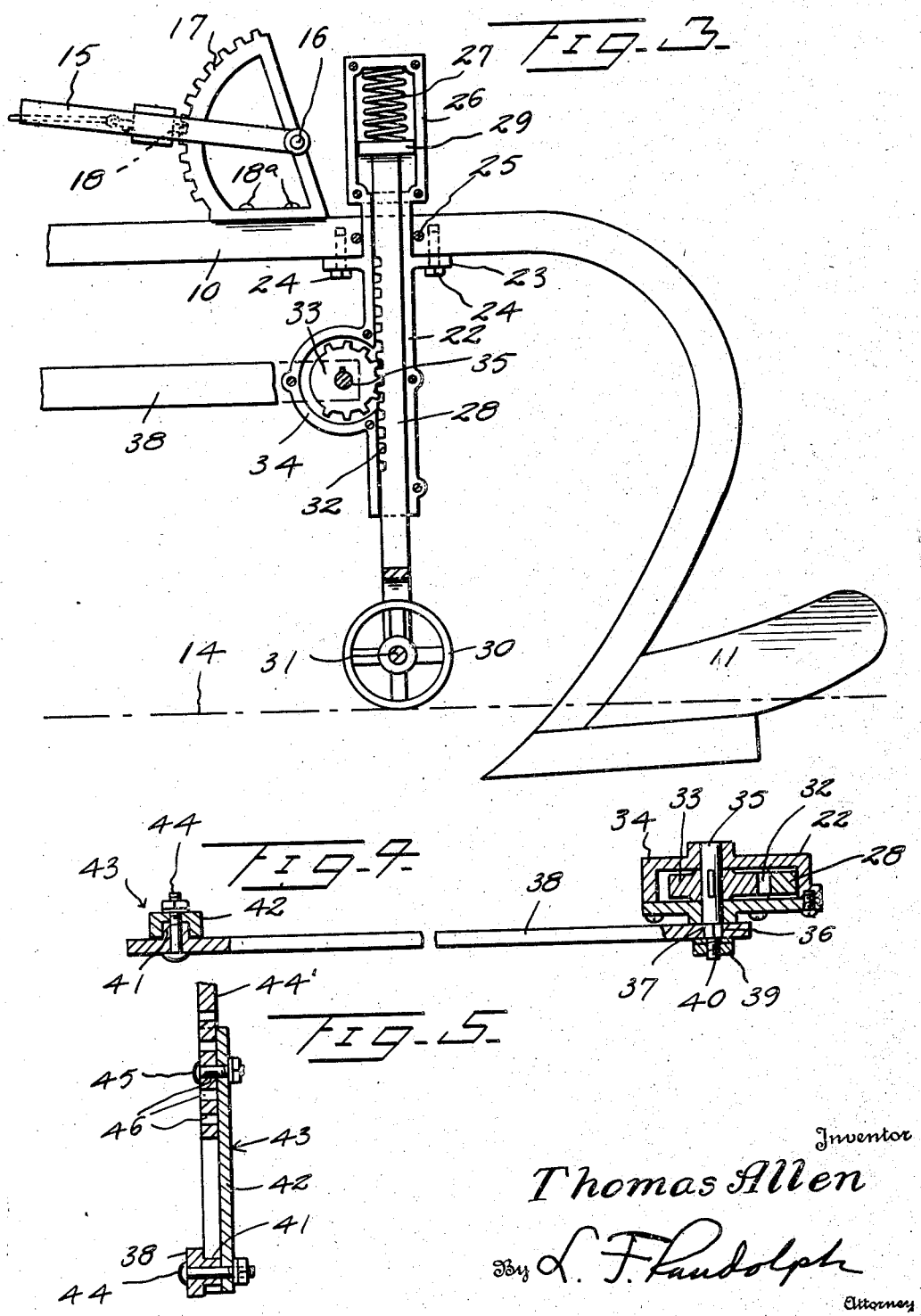

2,406,484

UNITED STATES PATENT OFFICE 2,406,484

DEPTH CONTROL FOR PLOWS

Thomas Allen, Davison, Mich.

Application January 26, 1944, Serial No. 519,793

1 Claim. (Cl. 97—189)

This invention relates to an automatic depth control for plows or the equivalent, and it aims generally to provide a means which will increase the efficiency of the plow.

The invention primarily concerns tractor or equivalent drawn trailer-type plows. As is well known, these plows do not plow at an even depth of furrow under average soil conditions. Where the ground is soft, they will cut deeper and many times bog down, and then where the soil is hard, they will cut shallow and very often rise out of the ground entirely under unfavorable soil conditions. Attempted manual adjustment under such conditions is annoying, is neglected, and it is practically impossible to have hired help make the adjustments.

This invention will overcome such difficulties by effecting the results automatically as the plow is drawn along.

The more specific objects and advantages will become apparent from a consideration of the description following taken in connection with accompanying drawings illustrating an operative embodiment.

In said drawings:

Figure 1 is a view showing the tractor-drawn plow equipped with my improvements;

Figure 2 is a plan view of the parts of Figure 1;

Figure 3 is a vertical section taken on the line 3—3 of Figure 1;

Figure 4 is a horizontal section taken on the line 4—4 of Figure 1; and

Figure 5 is a vertical section taken on the line 5—5 of Figure 1.

Referring specifically to the drawings wherein like reference characters designate like or similar parts, 10 designates a conventional plow beam carrying a plow share 11 as usual. Such beam at 12 is pivoted on a horizontal axis to a part 13 of a tractor whereby the plow is drawn over the field with the plow share 11 at the proper depth of cut in the ground, the line of which is suggested at 14.

A hand lever, or depth control of the plow is shown at 15, being pivoted at 16 to a toothed segment 17, mounted on the beam 10 as at 18. Lever 15 has a suitable conventional latch construction at 18 normally engaged with the segment 17 of the rack and which latch is adapted to be retracted under control of an auxiliary lever 19, pivoted at 20 to the lever 15, and having flexible linkage 21 therefrom to the latch 18, the latter being spring-pressed toward applied position. Latch 18 may be held disengaged or retracted by applying a ring 19a over lever 19 and extension 15a on lever 15.

Rigidly secured to the beam 10 is a vertical housing 22. The latter may have lugs 23 through which bolts 24 are passed into the beam, and a U-bolt 25 may also be used, being anchored to the beam and surrounding the housing 22.

Housing 22 has an enlarged upper portion 26 which houses an expansive coil spring 27. Slidable vertically in the housing 22 is a standard 28, which has a head 29 located in the enlargement 26 and in direct engagement with the spring 27. The lower end of standard 28 extends below the housing 22 and a ground wheel 30 is mounted on an axle 31 being carried thereby.

Said standard 28 has a series of rack teeth at 32 engaged with those of a mutilated gear 33 housed within an enlargement 34 of the housing 22. Mutilated gear 33 is keyed rigid on a short shaft 35 journaled in the enlargement 34 and projecting beyond the same. Rigidly connected to the short shaft 35 as through the engagement of a squared portion 36 on the latter in a squared opening 37 is a lever 38. A retaining nut 39 may be screw-threaded on the portion 40 of the shaft 35 to prevent accidental displacement of the lever 38.

Said lever 38 adjacent its other end has a lateral lug 41 which is engaged in the channel of a channel section 42 of a connecting bar 43. A bolt 44 may be passed through suitable openings to adjustably and pivotally secure the bar 43 and lever 38 together. The connecting bar 43 is completed by a section 44' which is disposed partly in the channel of the section 42 and the sections are adjustably secured together by passage of a bolt 45 through selected registering openings 46 in such bar. Bar or section 44' is adjustably fastened to the depth control lever 15 by a bolt 47 selectively passed throgh registering openings 48 in the section 44 of lever 15.

In the operation of the apparatus, it can be seen that the plow 11 can be adjusted to various cutting depths. Assuming that it is desired to cut a deeper furrow than is possible with the plow set at the position shown in Figure 1, the lever 19 of the latch means is pulled toward the handle 15a and may be held there by the retainer 19a, if desired and as shown in dotted lines (see Figure 1). With the dog 18 thus released from the teeth 19, the arm 15 can be lowered, which action will cause a downward movement of the free end of the gear carrying arm 38, which in turn will move the rack 28 upwardly (see Figure 3), elevating the wheel 30 and thus increasing the distance between the plane of travel of the plow and that of the traveling surface of the wheel 30.

Thus it can be seen that the wheel 30, supporting the plow with this greater distance between the planes of operation, will permit the plow to cut a deeper furrow. Of course when proper adjustment has been made, the lever 19 is released to permit the dog 18 to again engage the teeth 17.

A greater throw of the arm 38 is accomplished by adjustments 45, 46 between the rod 44 and the guide 42 (see Figure 1).

In order to cut a shallower furrow, the arm 15 would be moved upwardly at its handle end 15a, thus causing a reversed rotation of the gear 33 and a downward movement of the rack 28 and wheel 30, which would lessen the distance between the planes of operation of the wheel 30 and plow 11.

It will be realized that the improvements constitute an attachment and are readily applied to a plow beam merely through the use of bolts.

Various changes may be restorted to provided they fall within the spirit and scope of the invention.

I claim as my invention:

A depth control for plows in which the plow has a carrying beam, a gauge wheel, a guide on the beam, a rack slideable in the guide and carrying the gauge wheel, a gear meshing with the rack, a rack and detent on the beam, a pivotal arm on which the detent is mounted and cooperative with the last mentioned rack, means on the arm for actuating the detent, a second arm carrying the gear and a connection between the first mentioned arm and the free end of the second mentioned arm, said guide being provided with a hollow head portion containing a compression spring against which the first mentioned rack is operative.

THOMAS ALLEN.